United States Patent
Guo et al.

(10) Patent No.: US 10,838,430 B2
(45) Date of Patent: Nov. 17, 2020

(54) CLOCK SYNCHRONIZATION FOR TIME SENSITIVE NETWORKING IN VEHICULAR COMMUNICATION ENVIRONMENT

(71) Applicant: Mitsubishi Electric Research Laboratories, Inc., Cambridge, MA (US)

(72) Inventors: Jianlin Guo, Newton, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 215 days.

(21) Appl. No.: 15/911,439

(22) Filed: Mar. 5, 2018

(65) Prior Publication Data

US 2019/0271989 A1   Sep. 5, 2019

(51) Int. Cl.
*G05D 1/02* (2020.01)
*G01S 19/48* (2010.01)
(Continued)

(52) U.S. Cl.
CPC .......... *G05D 1/0285* (2013.01); *G01S 5/0284* (2013.01); *G01S 5/0289* (2013.01);
(Continued)

(58) Field of Classification Search
CPC .. G05D 1/0285; G05D 1/0088; G05D 1/0221; G05D 1/0291; G05D 2201/0212;
(Continued)

(56) References Cited

U.S. PATENT DOCUMENTS 9,355,561 B2    5/2016  Rubin et al.
2009/0167513 A1*  7/2009  Hill ........................ G01S 5/0072
                                              340/435
(Continued)

FOREIGN PATENT DOCUMENTS

CN            103472459           8/2013

OTHER PUBLICATIONS

Sadoun et al., "Location based services using geographical information system," ScienceDirect, Computer Communications 30 (2007) 3154-3160, Available online Jun. 27, 2007 (Year: 2007).*

(Continued)

*Primary Examiner* — Aniss Chad
*Assistant Examiner* — Mahmoud M Kazimi
(74) *Attorney, Agent, or Firm* — Gennadiy Vinokur; James McAleenan; Hironori Tsukamoto

(57) ABSTRACT

A vehicle includes a controller to control an operation of at least one component of the vehicle, a clock to synchronize the operation of the component of the vehicle, a memory to store a clock offset to the clock of the vehicle to synchronize the operation of the component of the vehicle, and a receiver to receive a set of heartbeat messages from a set of neighboring vehicles, each heartbeat message received from a neighboring vehicle includes a time of transmission of the heartbeat message, a location of the neighboring vehicle and a velocity of the neighboring vehicle. The receiver receives each heartbeat message at a corresponding receipt time measured using the clock of the vehicle. The vehicle also includes a processor to update the clock offset stored in the memory in response to determining concurrently an unknown clock offset and an unknown location of the vehicle at a particular time by comparing distances traveled by light between the times of the transmission of the heartbeat messages and corresponding receipt times (Continued)

adjusted with the unknown clock offset with distances between the vehicle at the unknown location and the locations of the neighboring vehicles retrieved from the heartbeat messages.

16 Claims, 12 Drawing Sheets

(51) Int. Cl.
    *H04W 56/00*     (2009.01)
    *G01S 5/02*     (2010.01)
    *H04W 84/18*     (2009.01)
    *G01S 19/51*     (2010.01)
    *G06F 1/12*     (2006.01)
    *G05D 1/00*     (2006.01)
    *G01S 19/23*     (2010.01)
    *G01S 19/07*     (2010.01)

(52) U.S. Cl.
    CPC .............. *G01S 19/07* (2013.01); *G01S 19/23* (2013.01); *G01S 19/48* (2013.01); *G01S 19/51* (2013.01); *G05D 1/0088* (2013.01); *G05D 1/0221* (2013.01); *G06F 1/12* (2013.01); *H04W 56/0025* (2013.01); *H04W 84/18* (2013.01); *G05D 1/0291* (2013.01); *G05D 2201/0212* (2013.01)

(58) Field of Classification Search
    CPC ...... G01S 5/0284; G01S 5/0289; G01S 19/07; G01S 19/23; G01S 19/48; G01S 19/51; G06F 1/12; H04W 56/0025; H04W 84/18
    USPC .......................................................... 701/23
    See application file for complete search history.

(56) References Cited

U.S. PATENT DOCUMENTS

2013/0116908 A1*   5/2013   Oh ...................... G05D 1/0278
                                                        701/96
2017/0227972 A1*   8/2017   Sabau .................... G05D 1/024
2019/0044728 A1*   2/2019   Karmoose ................ H04L 9/14

OTHER PUBLICATIONS

Efatmaneshnik et al., "Evaluation of a Cooperative Positioning Algorithm by Tight GPS/DSRC Integration for Vehicular Networks." International Global Navigation Satellite Systems Society, IGNSS Symposium 2011. University of New South Wales, Sydney, NSW, Australia. Nov. 15-17, 2011.

Evangeline Pollard, Denis Gingras. Improved Low Cost GPS Localization by Using Communicative Vehicles. 12th International Conference on Control, Automation, Robotics and Vision, ICARCV, Dec. 2012, Guangzhou, China. 2012. <hal-00735332>.

Sadoun et al., "Location based services using geographical information systems," ScienceDirect, Computer Communications 30 (2007) 3154-3160, Available online Jun. 27, 2007.

* cited by examiner $$c(t_{t1} - t_{r1} + c_0) = \sqrt{(x_1 - x)^2 + (y_1 - y)^2}$$

$$c(t_{t2} - t_{r2} + c_0) = \sqrt{(x_2 - x)^2 + (y_2 - y)^2}$$

$$c(t_{t3} - t_{r3} + c_0) = \sqrt{(x_3 - x)^2 + (y_3 - y)^2}$$

⎫ First trilateration (510)

⎫ Second trilateration (520)

FIG. 5A $$\left.\begin{array}{l}c(t_{r1} - t_{t1} + c_o) = \sqrt{(x_1 - x)^2 + (y_1 - y)^2 + (z_1 - z)^2} \\ c(t_{r2} - t_{t2} + c_o) = \sqrt{(x_2 - x)^2 + (y_2 - y)^2 + (z_2 - z)^2} \\ c(t_{r3} - t_{t3} + c_o) = \sqrt{(x_3 - x)^2 + (y_3 - y)^2 + (z_3 - z)^2} \\ c(t_{r4} - t_{t4} + c_o) = \sqrt{(x_4 - x)^2 + (y_4 - y)^2 + (z_4 - z)^2}\end{array}\right.$$

First trilateration: 515

Second trilateration: 525

FIG. 5B

CLOCK SYNCHRONIZATION FOR TIME SENSITIVE NETWORKING IN VEHICULAR COMMUNICATION ENVIRONMENT

TECHNICAL FIELD

This invention relates generally to the wireless communication in vehicular communication networks, and particularly to clock synchronization of the vehicles.

BACKGROUND

Vehicle-to-vehicle (V2V) is an automobile technology designed to allow automobiles to "talk" to each other. V2V communications enable vehicular communication systems and/or networks in which vehicles and roadside units are the communicating nodes, providing each other with information, such as safety warnings and traffic information. The vehicular communication systems can be effective in avoiding accidents, autonomous platooning and traffic congestion. However, those applications rely on time sensitivity in the vehicular communication network, which require synchronization of the clocks of the vehicles forming the vehicular communication network. Such a synchronization is commonly done based on the clocks of a Global Navigation Satellite System (GNSS).

GNSS is a system of satellites that can be used for determining the geographic location of a mobile receiver with respect to the earth. GNSS include GPS, Galileo, Glonass and BeiDou. Various global navigation satellite (GNS) correction systems are configured for receiving GNSS signal data from the GNSS satellites, for processing these GNSS data, for calculating GNSS corrections from the GNSS data, and for providing these corrections to a vehicle, with the purpose of achieving quicker and more accurate calculation of the vehicle's geographic position.

GNSS can be used to synchronize the clock of a vehicle, i.e., a GNSS receiver, with respect to the clock of the GNSS system. However, the GNSS receiver clocks drift relative to the stable atomic time scale that ultimately defines a particular GNSS system. Different vehicles with different GNSS receiver can have different drifts desynchronizing vehicular communication network. For example, inconsistencies of atmospheric conditions affect the speed of the GNSS signals as they pass through the Earth's atmosphere, especially the ionosphere. Correcting these errors is a significant challenge. These effects are smallest when the satellite is directly overhead and become greater for satellites nearer the horizon since the path through the atmosphere is longer. Once the receiver's approximate location is known, a mathematical model can be used to estimate and compensate for these errors. However, various position estimation methods can also have the ambiguity that are difficult to resolve, see, e.g., US 2017-0254901.

Accordingly, there is a need to clock synchronization for time sensitive networking in vehicular communication environment.

SUMMARY

Some embodiments are based on recognition that time sensitive networking provides solution for automotive industry to achieve real time control of the vehicles forming the vehicular communication network. Time sensitive networking requires network wise synchronization. Hence, the time sensitive vehicular communication network that allows participating vehicles to coordinate their operations can be achieved by synchronizing clocks of the vehicles participating in forming the network.

The clock of the vehicle can be synchronized to the clock of the Global Navigation Satellite System (GNSS) in communication with GNSS receiver of the vehicle. However, some embodiments are based on recognition that individual synchronization of the clock of the vehicle to a clock of the GNSS does not guarantee the synchronization of the vehicles in the vehicular communication networks due to different clock offsets errors that different vehicles might have. In addition, the GNSS synchronization can be negatively affected by multipath of the satellite signals in the urban environment. In addition, some vehicles in the vehicular communication network may not have a GNSS receiver.

Different standards provide protocols for mutual synchronization of the clocks. For example, IEEE has been developing precision time protocol (PTP) based synchronization standards. However, those protocols require information exchange between synchronizing devices, which in the context of versatile vehicular communication network can be impractical.

Some embodiments are based on realization that vehicular communication network has special requirements on participating vehicles. Unlike node in other networks, a vehicle in a vehicular communication network periodically announces its presence. For example, in IEEE Dedicated Short Range Communications (DSRC) for Wireless Access in Vehicular Environments (WAVE), a vehicle is required to transmit a heartbeat message every 100 ms to announce its presence to neighboring vehicles. The attributes of the heartbeat messages include one or combination of temporary ID, time, latitude, longitude, elevation, positional accuracy, speed and transmission, heading, acceleration, steering wheel angle, brake system status, and vehicle size.

Some embodiments are based on realization that this heartbeat message includes necessary synchronization data and therefore, can be used for synchronization. This approach reduces network traffic and mitigates the interference. With synchronization data transmitted automatically, vehicle can achieve silent synchronization without message exchange executed in conventional synchronization methods.

For example, some embodiments are based on realization that a clock of the vehicle can be synchronized to clocks of other vehicles based on trilateration of information received in multiple heartbeat messages under assumption that the clock offset of the vehicle and location of the vehicle are unknown. This is because the trilateration of the vehicle can be performed with two kinds of methods. One method uses distances that the light travels between the transmission and receipt time of the heartbeat message that is a function of the unknown clock offset. Another method uses distances between locations of the multiple vehicles and the time of transmitting the heartbeat messages and the unknown location of the vehicle at a particular time. By comparing these two kinds of distances it is possible to concurrently determine the unknown clock offset and unknown location of the vehicle at a particular time.

Some embodiments are based on recognition that above mentioned method can be used for the vehicle having a navigation system, such as GNSS, or vehicles without the navigation system. This is because when the location is determined with a navigation system that uses the clock, the mistake in the clock offset propagates to the location measurement. Thus, some embodiments do not trust that location, and subsequently deliberately use trilateration to determine concurrently the unknown clock offset and the unknown location (even when some values of the offset and the location are known). In such a manner, the offset uncertainty causing the location uncertainty can be corrected.

Accordingly, one embodiment discloses a vehicle including a controller to control an operation of at least one component of the vehicle; a clock to synchronize the operation of the component of the vehicle; a memory to store a clock offset to the clock of the vehicle to adjust the synchronization of the operation of the component of the vehicle; a receiver to receive a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle; and a processor to update the clock offset stored in the memory in response to determining concurrently an unknown clock offset and an unknown location of the vehicle at a particular time by comparing a first trilateration of distances traveled by light between the times of the transmission of the heartbeat messages and corresponding receipt times adjusted with the unknown clock offset with a second trilateration of distances between the vehicle at the unknown location and the locations of the neighboring vehicles retrieved from the heartbeat messages.

Another embodiment discloses a method for controlling a vehicle, wherein the method uses a processor coupled with stored instructions implementing the method, wherein the instructions, when executed by the processor carry out at least some steps of the method that includes receiving a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle; determining concurrently an unknown clock offset and an unknown location of the vehicle at a particular time by comparing distances between the vehicle at the unknown location and the locations of the neighboring vehicles retrieved from the heartbeat messages with distances traveled by light between the times of the transmission of the heartbeat messages and corresponding receipt times adjusted with the unknown clock offset; updating a clock of the vehicle with the determined clock offset; and controlling an operation of at least one component of the vehicle according to the updated clock of the vehicle.

Yet another embodiment discloses a non-transitory computer readable storage medium embodied thereon a program executable by a processor for performing a method, the method includes receiving a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle; determining concurrently an unknown clock offset and an unknown location of the vehicle at a particular time by comparing distances between the vehicle at the unknown location and the locations of the neighboring vehicles retrieved from the heartbeat messages with distances traveled by light between the times of the transmission of the heartbeat messages and corresponding receipt times adjusted with the unknown clock offset; updating a clock of the vehicle with the determined clock offset; and controlling an operation of at least one component of the vehicle according to the updated clock of the vehicle.

BRIEF DESCRIPTION OF THE DRAWINGS

FIG. 5A and FIG. 5B show examples of trilateration used by some embodiment for silent synchronization of a clock of a vehicle.

DETAILED DESCRIPTION

Figure 1:
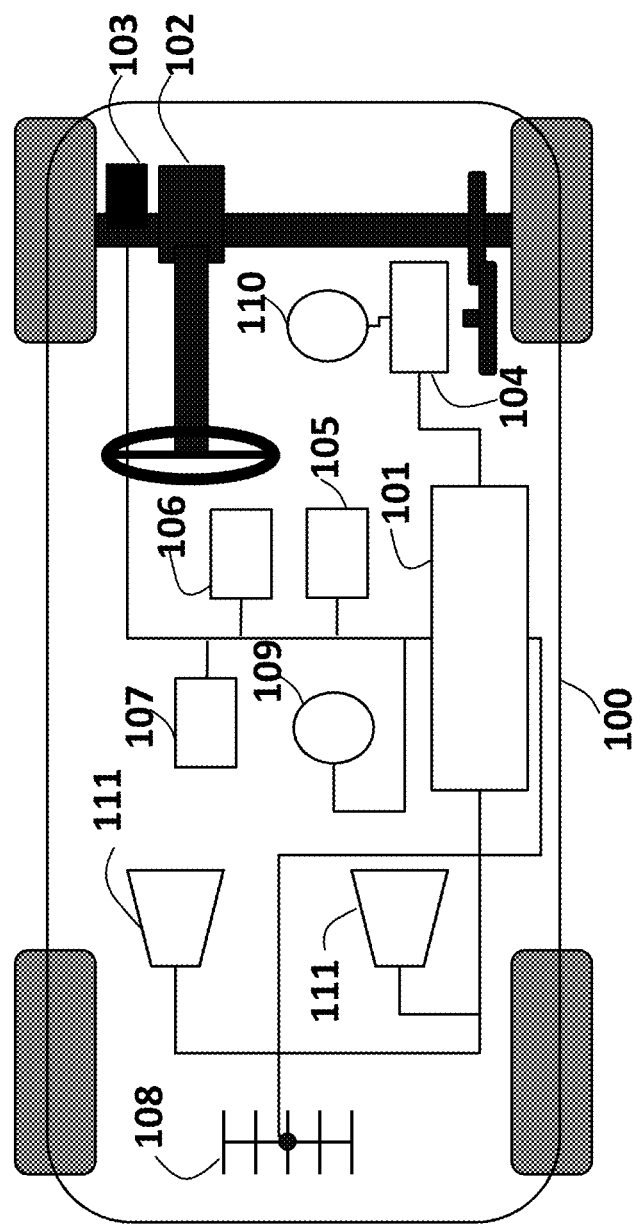
FIG. 1 shows a schematic of a vehicle participating time sensitive networking and performing silent clock synchronization and location determination according to some embodiments.

FIG. 1 shows a schematic of the vehicle 100 participating time sensitive networking and performing silent clock synchronization and location determination according to some embodiments. As used herein, the vehicle 100 can be any type of wheeled vehicle, such as a passenger car, bus, or rover. Also, the vehicle 100 can be an autonomous or semi-autonomous vehicle. The vehicle 100 includes a controller 101 to control an operation of at least one component of the vehicle. Examples of the controllable components of the vehicle 100 include a steering system 102, a brake system 103, a navigation system 104, etc. In one embodiment, the steering system 102 is controlled by a controller 101. Additionally, or alternatively, the steering system 102 can be controlled by a driver of the vehicle 100.

The vehicle 100 includes a clock 105 to provide timing and/or a clock to synchronize the operation of the component of the vehicle, a memory 106 to store synchronization data such as storing a clock offset to the clock of the vehicle to adjust the synchronization of the operation of the component of the vehicle, a processor 107 to perform clock and location computation, a transceiver 108 to receive and transmit V2V messages including heartbeat messages, and an internal measurement unit (IMU) 109 to measure the velocity of the vehicle 100. The vehicle 100 can also include a GNSS receiver 110 to receive GNSS signals, and one or more sensors 111 to sense the status of the vehicle 100.

In various embodiments, the transceiver 108 includes a receiver to receive a set of heartbeat messages from a set of neighboring vehicles, each heartbeat message received from a neighboring vehicle includes a time of transmission of the heartbeat message, a location of the neighboring vehicle and a velocity of the neighboring vehicle. The receiver receives each heartbeat message at a corresponding receipt time measured using the clock of the vehicle.

Based on the data retrieved from the heartbeat messages, the processor 107 updates the clock offset stored in the memory 106. In some embodiments, the processor 107 determines concurrently an unknown clock offset and an unknown location of the vehicle at a particular time by comparing distances between the vehicle at the unknown location and the locations of the neighboring vehicles retrieved from the heartbeat messages with distances traveled by light between the times of the transmission of the heartbeat messages and corresponding receipt times adjusted with the unknown clock offset.

Some embodiments are based on recognition that time sensitive networking provides solution for automotive industry to achieve real time control of the vehicles forming the vehicular communication network. Time sensitive networking requires network wise synchronization. Hence, the time sensitive vehicular communication network that allows participating vehicles to coordinate their operations can be achieved by synchronizing clocks of the vehicles participating in forming the network.

The clock of the vehicle can be synchronized to the clock of the Global Navigation Satellite System (GNSS) in communication with GNSS receiver of the vehicle. However, some embodiments are based on recognition that individual synchronization of the clock of the vehicle to a clock of the GNSS does not guarantee the synchronization of the vehicles in the vehicular communication networks due to different clock offsets errors that different vehicles might have.

To that end, for vehicle 100 to participate in time sensitive networking, clock synchronization is required. Clock synchronization in vehicular communication network is different from clock synchronization in other networks, which may require extra message exchange.

Different standards provide protocols for mutual synchronization of the clocks. For example, IEEE has been developing precision time protocol (PTP) based synchronization standards. However, those protocols require information exchange between synchronizing devices, which in the context of versatile vehicular communication network can be impractical.

Figure 2:
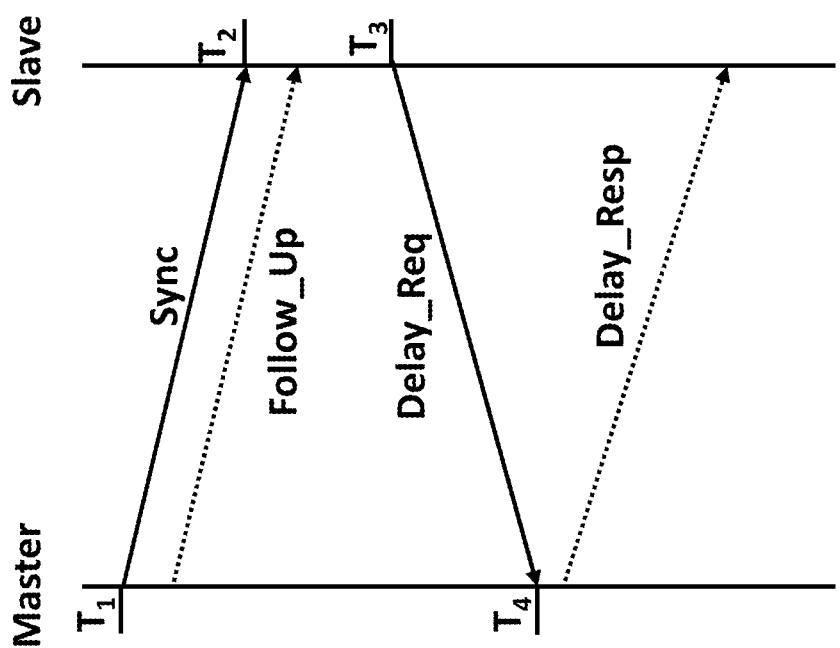
FIG. 2 shows the synchronization message exchange in IEEE Precision Time Protocol (PTP) based synchronization.

FIG. 2 shows the synchronization message exchange in IEEE Precision Time Protocol (PTP) based synchronization. Such a synchronization requires at least two message exchanges between master and slave. Master first sends a Sync message to slave at time $T_1$. Slave receives Sync message at time $T_2$. Even Sync message contains the timestamp $T_1$, for more precise synchronization, master may send a Follow_Up message that contains the precise timestamp $T_1$ to slave. After processing Sync message and Follow_Up message received from master, slave sends a Delay_Req message to master at time $T_3$. Once master receives the Delay_Req message at time $T_4$, it sends back a Delay_Resp message that contains timestamp $T_4$ to slave. Using four timestamps $T_1$, $T_2$, $T_3$ and $T_4$, slave computes message propagation time and clock offset, and therefore, synchronizes its clock to master's clock. For example, for symmetric link, the propagation time $t_p$ and clock offset $t_o$ can be computed as $$t_p = \frac{(T_4 - T_1) - (T_3 - T_2)}{2} \text{ and} \qquad (1)$$

$$t_o = \frac{(T_2 - T_1) + (T_3 - T_4)}{2} \qquad (2)$$

Some embodiments are based on realization that vehicular communication network has special requirements on participating vehicles. Unlike node in other networks, a vehicle in a vehicular communication network periodically announces its presence. For example, in IEEE Dedicated Short Range Communications (DSRC) for Wireless Access in Vehicular Environments (WAVE), a vehicle is required to transmit a heartbeat message every 100 ms to announce its presence to neighboring vehicles. The attributes of the heartbeat messages include one or combination of temporary ID, time, latitude, longitude, elevation, positional accuracy, speed and transmission, heading, acceleration, steering wheel angle, brake system status, and vehicle size.

Some embodiments are based on realization that this heartbeat message includes necessary synchronization data and therefore, can be used for synchronization. This approach reduces network traffic and mitigates the interference. With synchronization data transmitted automatically, vehicle can achieve silent synchronization without message exchange executed in conventional synchronization methods.

Figure 3:
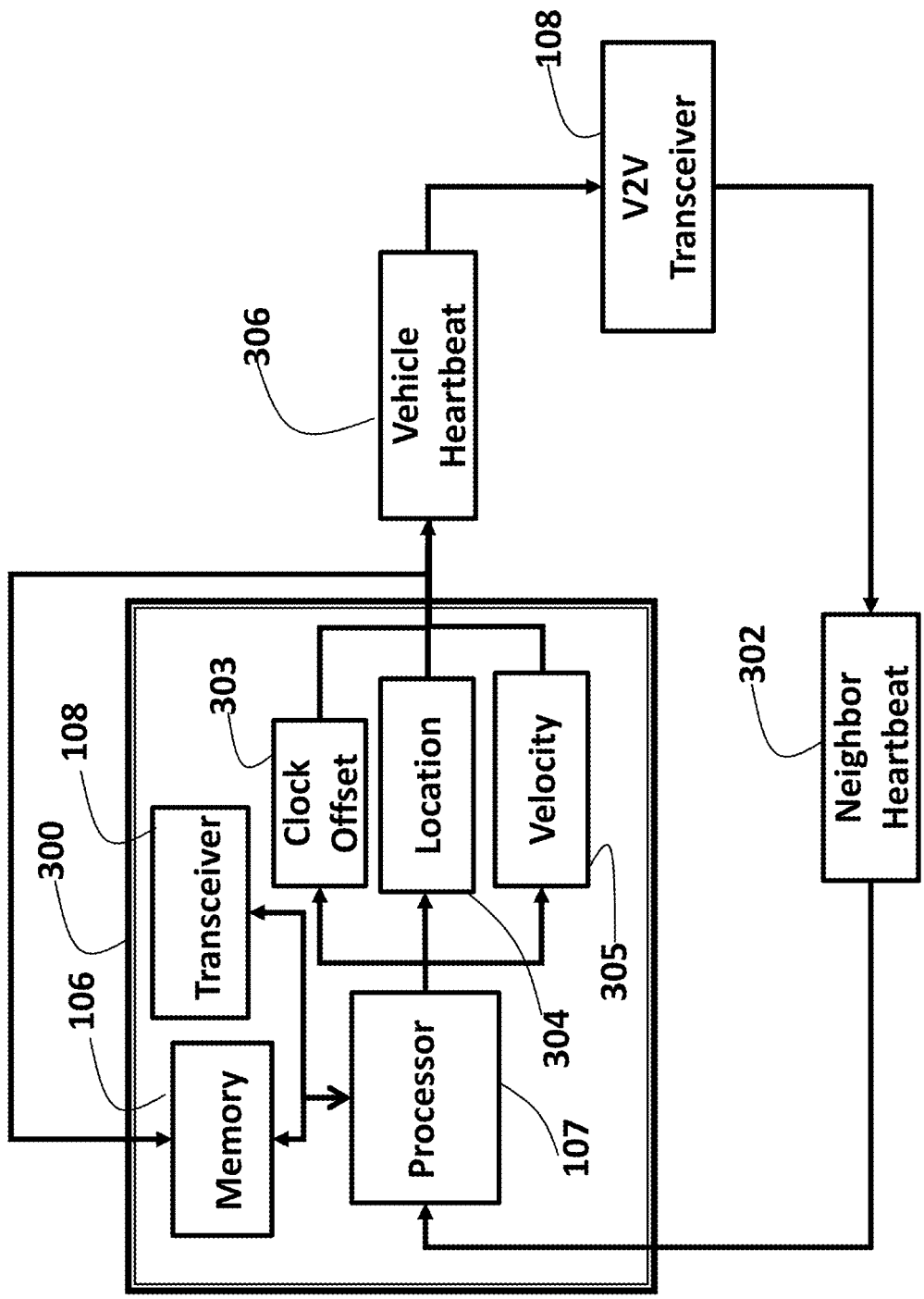
FIG. 3 shows a block diagram of a control system for silent synchronization of a vehicle based on the received heartbeat messages according to one embodiment.

FIG. 3 shows a block diagram of a control system 300 for silent synchronization of a vehicle based on the received heartbeat messages according to one embodiment. The control system 300 includes the processor 107 connected to a memory 106 and a transceiver 108. When the transceiver 108 of the vehicle 100 receives a heartbeat message 302 from a neighboring vehicle, the processor 107 processes heartbeat message 302 to obtain necessary information such as timestamp indicating a time of transmission of the heartbeat message 302, a location of the neighboring vehicle at the time of transmission, a velocity of the neighboring vehicle at the time of transmission, etc. The processor 107 can store this information into memory 106. The processor 107 then computes a new clock offset 303, new location 304 and other metrics of the vehicle 100. The control system 300 can also use internal measurement unit 109 to measure new velocity 305. These new metrics are stored in memory 106. Based on new metrics, a heartbeat message 306 is generated by the control system 300. The new heartbeat message 306 of the vehicle 100 is then transmitted by vehicle 100 via transceiver 108. In such a manner, the vehicle and the neighboring vehicles iteratively synchronize their clocks to each other.

For vehicle with a GNSS receiver 110 and navigation system 104, two sets of clock offset, location and other metrics can be maintained, one set computed according to some embodiments and another set computed from GNSS system. The first set of metrics is used to participating time sensitive networking.

Figure 4:
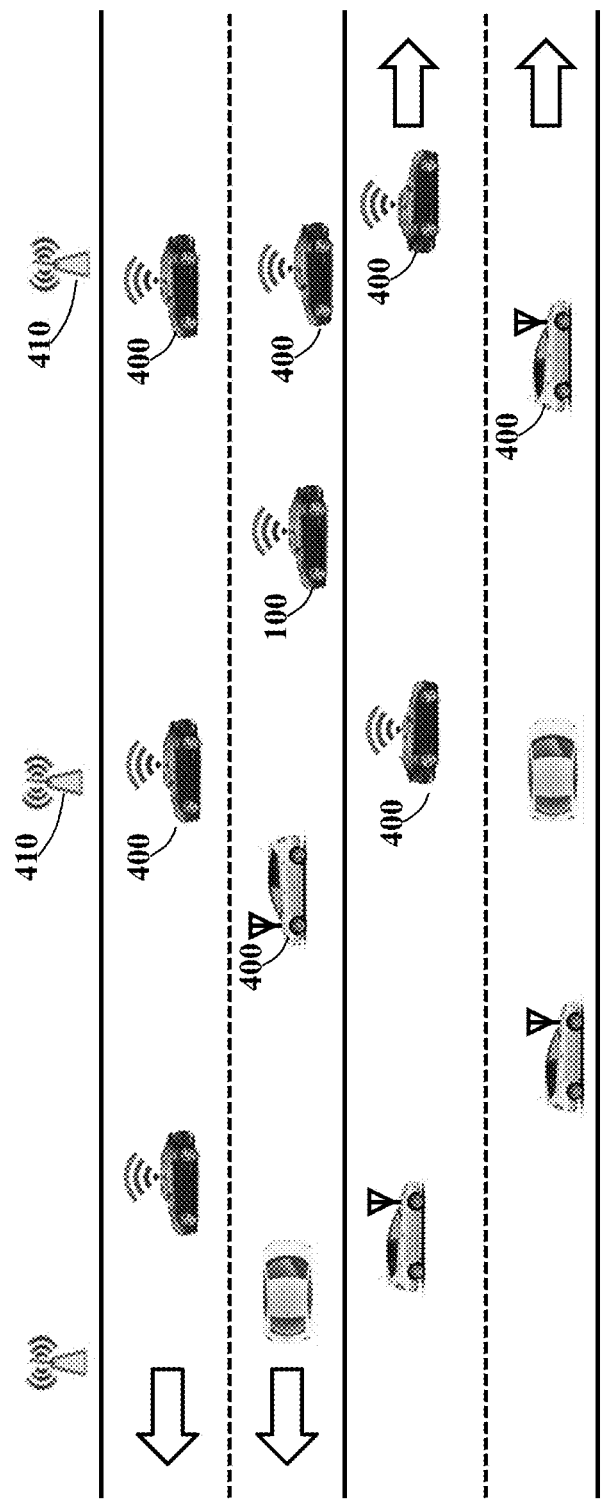
FIG. 4 shows an example of the neighborhood of the vehicle according to some embodiments.

FIG. 4 shows an example of the neighborhood of the vehicle according to some embodiments. As shown in FIG. 4, for the vehicle 100, a neighbor in vehicular communication network can be a neighboring vehicle 400 or a roadside unit (RSU) 410, which can transmit alert message or control command message. A RSU 410 has a fixed location and does not move.

FIG. 5A and FIG. 5B show examples of trilateration used by some embodiment for silent synchronization of a clock of a vehicle. Specifically, some embodiments are based on realization that a clock of the vehicle can be synchronized to clocks of other vehicles based on trilateration of information received in multiple heartbeat messages under assumption that the clock offset of the vehicle and the location of the vehicle are unknown. In general trilateration is the process of determining absolute or relative locations of points by measurement of distances, using the geometry of circles, spheres and/or triangles, etc.

In some embodiments, the trilateration of the vehicle can be performed with two kinds of methods to compare two kinds of distances. One trilateration 510, referred herein as a first trilateration, uses distances that the light travels between the transmission and receipt time of the heartbeat message that is a function of the unknown clock offset. Another trilateration 520, referred herein as a second trilateration, uses distances between locations of the multiple vehicles and the unknown location of the vehicle at a particular time. By comparing the two trilateration it is possible to concurrently determine the unknown clock offset and unknown location of the vehicle at a particular time.

The trilateration 510 and 520 are design for silent synchronization of the vehicles located on one plane. FIG. 5B shows examples of trilaterations 515 and 525 each including four equations for silent synchronization of the vehicles in three-dimensional coordinate system.

Some embodiments are based on recognition that above mentioned method can be used for the vehicle having a navigation system, such as GNSS, or vehicles without the navigation system. This is because when the location is determined with a navigation system that uses the clock, the mistake in the clock offset propagates to the location measurement. Thus, some embodiments do not trust that location, and subsequently deliberately use trilateration to determine concurrently the unknown clock offset and the unknown location (even when some values of the offset and the location are known). In such a manner, the offset uncertainty causing the location uncertainty can be corrected.

Accordingly, one embodiment discloses vehicle including a controller to control an operation of at least one component of the vehicle; a clock to synchronize the operation of the component of the vehicle; a memory to store a clock offset to the clock of the vehicle to adjust the synchronization of the operation of the component of the vehicle; a receiver to receive a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle; and a processor to update the clock offset stored in the memory in response to determining concurrently an unknown clock offset and an unknown location of the vehicle at a particular time by comparing a first trilateration of distances between the vehicle at the unknown location and the locations of the neighboring vehicles retrieved from the heartbeat messages with a second trilateration of distances traveled by light between the times of the transmission of the heartbeat messages and corresponding receipt times adjusted with the unknown clock offset.

Figure 7:
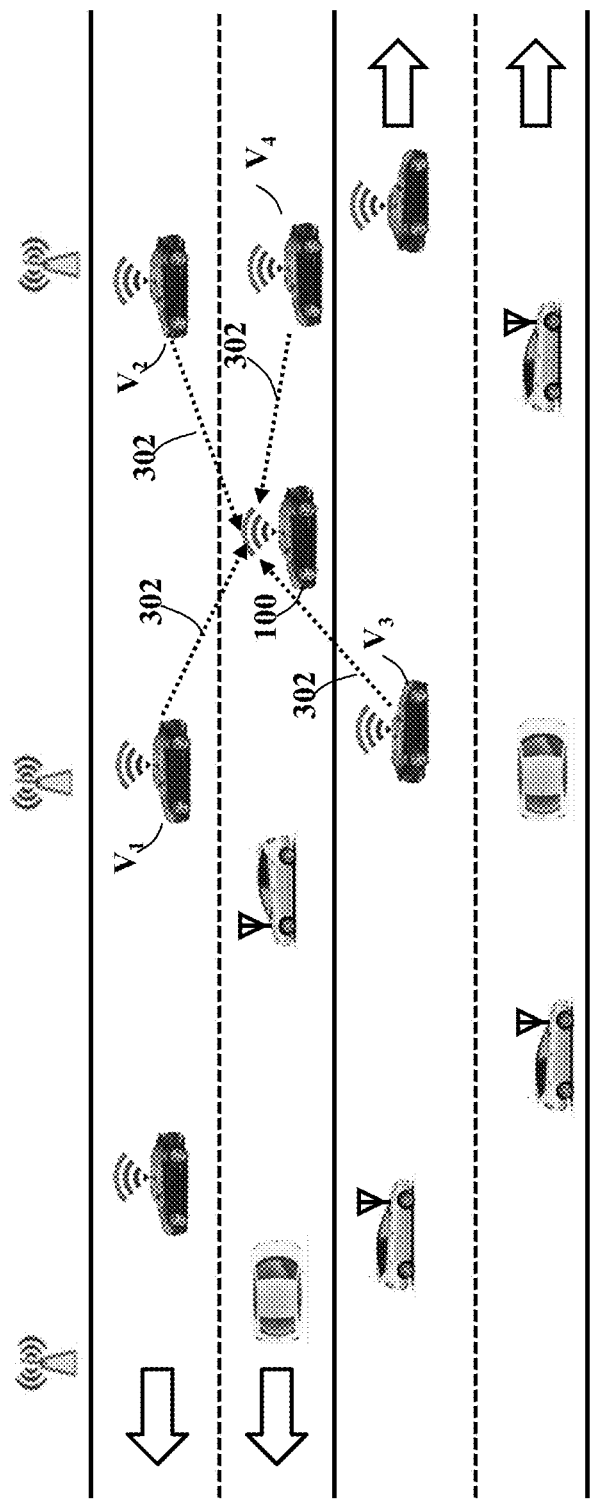
FIG. 7 shows a schematic of the vehicle receiving the heartbeat messages from four neighbors V1, V2, V3 and V4 according to one embodiment.

For example, in some embodiments, the processor uses synchronization data retrieved from heartbeat messages including, e.g., timestamp, location, velocity moving direction, acceleration, etc. To achieve silent synchronization, synchronization node, i.e., the control system selects three vehicles that are on the plane or four vehicles that are not on same plane to perform its clock synchronization and location estimation. Assume the synchronization vehicle 100 receives heartbeat messages from four neighboring vehicles $V_i$ (i=1, 2, 3, 4) as shown in FIG. 7. There are two cases for synchronization vehicle 100 to receive heartbeat messages from neighboring vehicles: 1) the synchronization vehicle 100 receives heartbeat messages from neighboring vehicles at same and 2) the synchronization vehicle 100 receives heartbeat messages from neighboring vehicles at different times.

If the synchronization vehicle receives heartbeat messages at same time, following four equations are used to calculate the clock offset $c_o$ and the location (x, y, z) of synchronization vehicle 100

$$c(t_{r1}-t_{t1}+c_o)=\sqrt{(x_1-x)^2+(y_1-y)^2+(z_1-z)^2} \quad (3)$$

$$c(t_{r2}-t_{t2}+c_o)=\sqrt{(x_2-x)^2+(y_2-y)^2+(z_2-z)^2} \quad (4)$$

$$c(t_{r3}-t_{t3}+c_o)=\sqrt{(x_3-x)^2+(y_3-y)^2+(z_3-z)^2} \quad (5)$$

$$c(t_{r4}-t_{t4}+c_o)=\sqrt{(x_4-x)^2+(y_4-y)^2+(z_4-z)^2} \quad (6),$$

where c is the speed of the light, $t_{ti}$ (i=1, 2, 3, 4) is the time at which neighboring vehicles $V_i$ (i=1, 2, 3, 4) transmitted synchronization data in the heartbeat messages 302, $t_{ri}$ (i=1, 2, 3, 4) is the time at which synchronization vehicle 100 received the synchronization data from neighboring vehicles $V_i$ (i=1, 2, 3, 4), and $(x_i, y_i, z_i)$ is the location of the neighboring vehicles $V_i$ (i=1, 2, 3, 4). Since the synchronization vehicle 100 receives the four heartbeat messages at same time, $t_{ri}$ (i=1, 2, 3, 4) are same and the location (x, y, z) is the unknown location of the synchronization vehicle 100 at the time it receives the four heartbeat messages. However, $t_{ti}$ (i=1, 2, 3, 4) are different because they are measured according to clocks of four neighboring vehicles. The unknown clock offset can be an offset to an atomic clock or to an optimal clock computed from four clocks of the neighboring vehicles, e.g., an average of four clock offsets.

Even when the four neighboring vehicles are not on the same plane, the vehicle 100 can uniquely compute its clock offset $c_o$ and location (x, y, z). If all neighboring vehicles are on the same plane, then one of the coordinates is same for all neighboring vehicles. Synchronization vehicle 100 uses the common coordinate as its corresponding coordinate and three neighboring vehicles that are not on the same line to calculate its clock offset $c_o$ and other two coordinates of the location. If all neighboring vehicles are on the same line, then two of the coordinates are same for all neighboring vehicles. Synchronization vehicle 100 uses the common coordinates as its corresponding coordinates and two neighboring vehicles with different locations to calculate its clock offset $c_o$ and the remaining one coordinates of its location.

When the heartbeat messages of the neighboring vehicles are received at different times the requirement of constant location of the vehicle 100 for different heartbeat transmissions is violated. To that end, some embodiments use the velocity of the vehicle 100 to adjust the location of the vehicle 100 for different heartbeat transmissions. For example, in one embodiment, the IMU 109 of the vehicle determines a velocity of the vehicle, and the processor adjusts the unknown location of the vehicle at the particular time in the second trilateration of distances based on differences of the time of receipt of different heartbeat messages and the velocity of the vehicle.

For example, the vehicle 100 needs to concurrently determine four unknowns in the synchronization process, i.e., its clock offset and its location (x, y, z), by comparing a second trilateration of distances between the vehicle at the unknown location and the locations of the neighboring vehicles retrieved from the heartbeat messages with a first trilateration of distances traveled by light between the times of the transmission of the heartbeat messages and corresponding receipt times adjusted with the unknown clock offset. To achieve silent synchronization, the vehicle 100 selects four or more neighboring vehicles that are not on the same plane to perform clock synchronization and location determination.

FIG. 7 shows a schematic of the vehicle 100 receiving the heartbeat messages 302 from four neighboring vehicles $V_1$, $V_2$, $V_3$ and $V_4$ according to one embodiment. In addition to receiving heartbeat messages from four neighbors, the vehicle 100 also uses its internal measurement unit (IMU) 109 to measure its velocity. Using received heartbeat messages and the measured velocity, following four equations are used by the embodiment to calculate the clock offset $c_o$ of the vehicle 100 and the location (x, y, z) of the vehicle 100:

$$\sqrt{(x_1 - x_0 - (t_{r1} - t_{mi})v_x)^2 + (y_1 - y_0 - (t_{r1} - t_{mi})v_y)^2 + (z_1 - z_0 - (t_{r1} - t_{mi})v_z)^2} = c(t_{r1} - t_{t1} + c_o) \quad (7)$$

$$\sqrt{(x_2 - x_0 - (t_{r2} - t_{mi})v_x)^2 + (y_2 - y_0 - (t_{r2} - t_{mi})v_y)^2 + (z_2 - z_0 - (t_{r2} - t_{mi})v_z)^2} = c(t_{r2} - t_{t2} + c_o) \quad (8)$$

$$\sqrt{(x_3 - x_0 - (t_{r3} - t_{mi})v_x)^2 + (y_3 - y_0 - (t_{r3} - t_{mi})v_y)^2 + (z_3 - z_0 - (t_{r3} - t_{mi})v_z)^2} = c(t_{r3} - t_{t3} + c_o) \quad (9)$$

$$\sqrt{(x_4 - x_0 - (t_{r4} - t_{mi})v_x)^2 + (y_4 - y_0 - (t_{r4} - t_{mi})v_y)^2 + (z_4 - z_0 - (t_{r3} - t_{mi})v_z)^2} = c(t_{r4} - t_{t4} + c_o) \quad (10)$$

where c is the speed of the light, $t_{ti}$ (i=1, 2, 3, 4) is the time at which neighboring vehicle $V_i$ (i=1, 2, 3, 4) transmitted heartbeat message 302, $t_{ri}$ (i=1, 2, 3, 4) is the time at which the vehicle 100 received the heartbeat message 302 from neighboring vehicle $V_i$ (i=1, 2, 3, 4), ($x_i$, $y_i$, $z$) is the location of the neighboring vehicle $V_i$ at where neighboring vehicle $V_i$ (i=1, 2, 3, 4) transmitted its heartbeat message 302, $t_{mi}$=min{$t_{r1}$, $t_{r2}$, $t_{r3}$, $t_{r4}$}, ($x_0$, $y_0$, $z_0$) is the location of vehicle 100 at time $t_{mi}$ and ($v_x$, $v_y$, $v_z$) is the velocity of vehicle 100 measured at time $t_{mi}$ using IMU 109. Equations (3)-(6) solve for clock offset $c_o$ and location ($x_0$, $y_0$, $z_0$). Therefore, at time $t_{ma}$=max {$t_{r1}$, $t_{r2}$, $t_{r3}$, $t_{r4}$}, the location (x, y, z) of vehicle 100 can be computed as (x, y, z)=($x_0$, $y_0$, $z_0$)+($t_{ma}$-$t_{mi}$)*($v_x$, $v_y$, $v_z$). In this case, $t_{ri}$ (i=1, 2, 3, 4) are different.

In each equation of equations (7)-(10), the left hand side of the equation is the second trilateration of distance between the vehicle at the unknown location and the location of the neighbor vehicle retrieved from the heartbeat message, and the right hand side of the equation is the first trilateration of distance traveled by light between the time of the transmission of the heartbeat message and corresponding receipt time adjusted with the unknown clock offset.

Because four neighboring vehicles are not on the same plane, the vehicle 100 can uniquely compute its clock offset $c_o$ and the location (x, y, z). If all neighboring vehicles are on the same plane, then one of the coordinates is same for all neighboring vehicles. The vehicle 100 uses the common coordinate as its corresponding coordinate and three neighboring vehicles that are not on the same line to calculate its clock offset $c_o$ and other two coordinates of the location. If all neighboring vehicles are on the same line, then two of the coordinates are same for all neighboring vehicles. Vehicle 100 uses the common coordinates as its corresponding coordinates and two neighboring vehicles with different locations to calculate its clock offset $c_o$ and the remaining one coordinates of its location.

Figure 6:
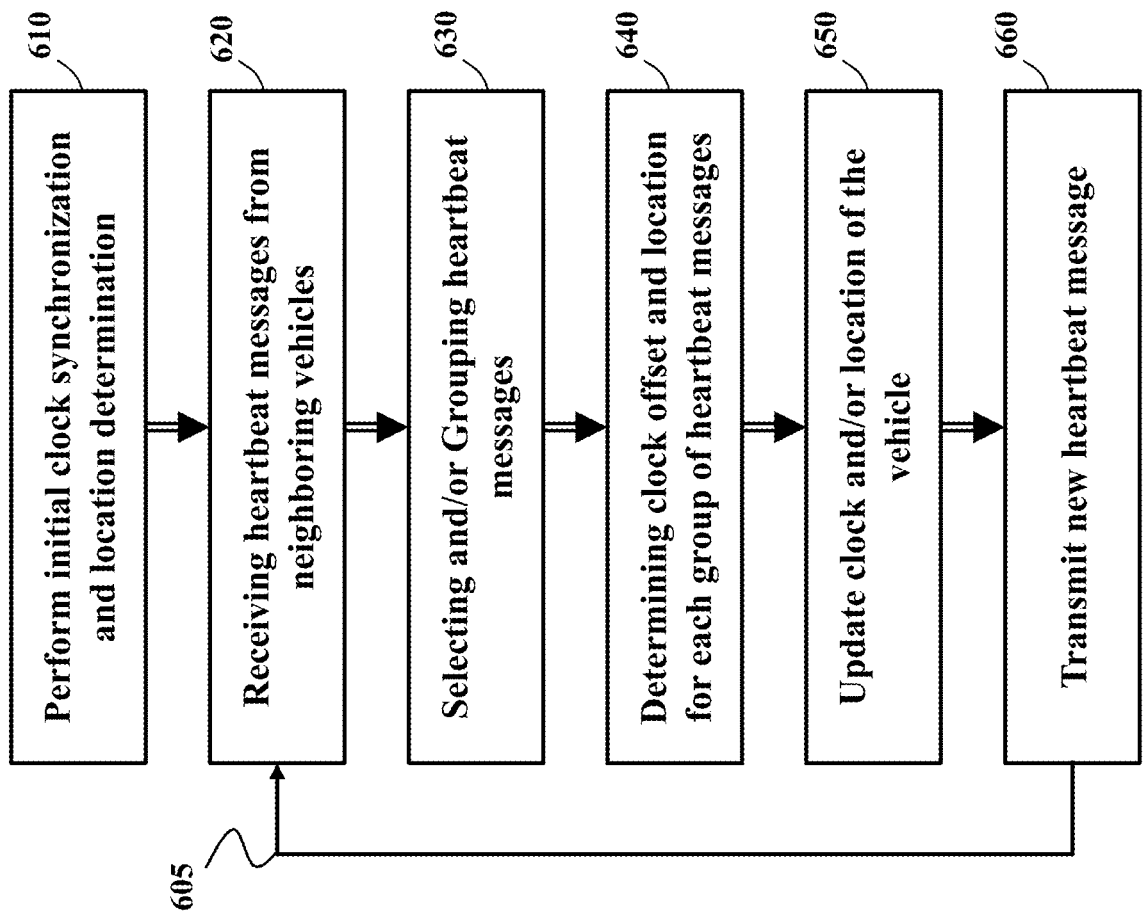
FIG. 6 shows a block diagram of a method for iterative silent synchronization among a group of vehicles according to some embodiments.

FIG. 6 shows a block diagram of a method for iterative silent synchronization among a group of vehicles according to some embodiments. Vehicles forming a time sensitive network perform an iteration of synchronization to achieve more accurate clock offset computation. In one optional implementation, the vehicle 100 first performs initial clock synchronization and location estimation 610. For example, the vehicle 100 can perform initial clock synchronization using GNSS receiver and can perform location estimation using the GNSS receiver and/or movement estimation of the IMU.

In various embodiments, the vehicle 100 improves its clock offset and/or location accuracy by performing a number of iterations 605 of the silent synchronization method. In each iteration, the vehicle 100 receives 620 the heartbeat messages from neighboring vehicles. In one embodiment, the vehicle selects 630 the subset of heartbeat messages transmitted by a subset of neighboring vehicles. For example, the vehicle selects the heartbeat messages transmitted by the neighboring vehicles participating in a common control application with the vehicle 100. Example of such a control application is a platooning the group of vehicle. In alternative embodiment, the vehicle selects the heartbeat messages transmitted by the neighboring vehicles with in a minimum time period with the vehicle 100. This embodiment is based on understanding that a number of iterations to perform the silent synchronization needs to be completed within a minimum time period of one-hop message exchange among the synchronizing vehicles.

In some situations, the number of received and/or selected heartbeat messages is greater than four heartbeat messages for 3D space synchronization shown in FIG. 5B. In these situations, the embodiments select and group 630 the messages to form multiple trilateration comparison systems. Next, the embodiment determines 640 the clock offset and location of the vehicle for each group of heartbeat messages using the trilateration comparison, i.e., distance comparison.

Some embodiments are based on recognition that trilateration comparison systems of FIGS. 5A and 5B are better suited for situations when the heartbeat messages of the neighboring vehicles are received at the same time. This is because the trilateration of the vehicle assumes constant location. To that end, when the receiver of the vehicle 100 receives the heartbeat messages greater than the number of unknowns, e.g., three unknowns in the system of FIG. 5A and four unknowns in the system of FIG. 5B, and the processor 107 of the vehicle selects and groups 630 the set of heartbeat messages with differences of the time of transmission less than a threshold. In such a manner, the trilateration comparison systems of FIGS. 5A and 5B can be used to simplify the computations.

For example, in some embodiments, the processor selects 630 M reliable heartbeat messages from neighboring vehicles to update its clock and location. Thus, there are $K=c_M^4$ possible combinations to select four neighbors from M reliable neighbors. For each combination, equations (7)-(10) are applied 640 to determine a clock offset $c_o^i$ and location $(x_i, y_i, z_i)$ (i=1, 2, ..., K). Using these offsets and locations, the vehicle 100 can update 650 a clock offset of the vehicle as an average of corresponding values according to $$c_o = \frac{\sum_{i=1}^{K} c_o^i}{K} \quad (11)$$

and location as $$(x, y, z) = \left(\frac{\sum_{i=1}^{K} x_i}{K}, \frac{\sum_{i=1}^{K} y_i}{K}, \frac{\sum_{i=1}^{K} z_i}{K}\right) \quad (12)$$

Other methods can also be used to compute optimal clock offset co and location (x, y, z) based on $c_o^i$ and $(x_i, y_i, z_i)$ (i=1, 2, ..., K).

After the clock and location are updated, vehicle 100 uses IMU 109 to measure its velocity. The vehicle 100 then transmits 660 a new heartbeat message to announce its new information to its neighbors. The neighbors may use heartbeat message transmitted by vehicle 100 to update their clock offsets, locations and transmit new heartbeat messages. After a predefined number of iterations 605, vehicle 100 and its neighbors can achieve a desired clock synchronization.

Some embodiments are based on recognition that in vehicular communication environment, data delivery is not reliable due to high mobility and possible cyber-attack. Therefore, vehicle 100 needs to use more reliable heartbeat messages to perform clock synchronization. Different embodiments use different ways to identify reliable heartbeat messages. For example, one embodiment applies the machine learning in data classification. Neural network is one of the machine learning techniques.

In order for neural network to learn more reliable heartbeat messages, it is better to receive more heartbeat messages from a neighbor. To do so, the vehicle 100 needs to have longer communication duration with a neighbor. However, in vehicular communication networks, there are many factors, e.g., location, speed, moving direction, etc., that affect communication duration between vehicle 100 and a neighbor.

Figure 8:
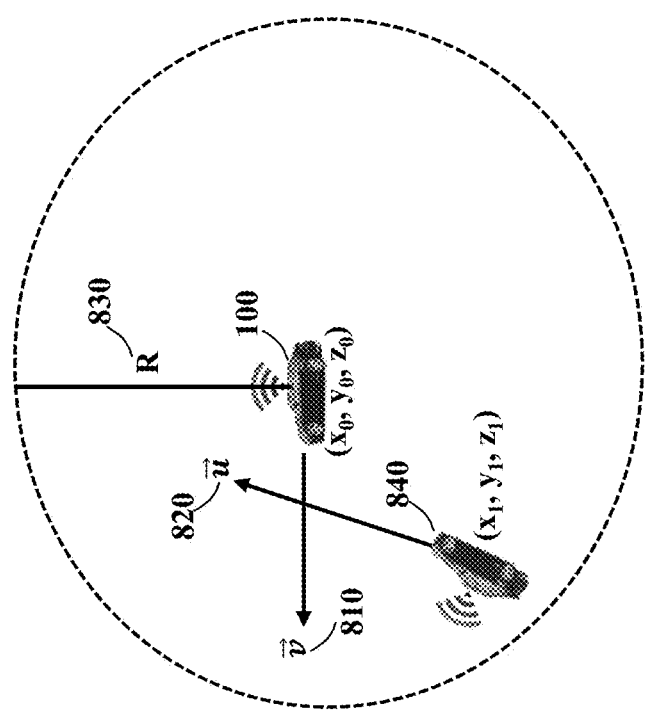
FIG. 8 shows a schematic to compute communication duration between vehicle and a neighboring vehicle according to one embodiment.

FIG. 8 shows a schematic to compute communication duration between vehicle 100 and a neighbor vehicle 840 according to one embodiment. In this embodiment, the vehicle 100 is moving in the direction $\vec{v}$ 810, neighbor vehicle 840 is moving in direction $\vec{u}$ 820 and communication range is R 830. Assume vehicle 100 receives the first heartbeat message at time $t_o$ from neighbor 840 when vehicle 100 is located at $(x_0, y_0, z_0)$ and neighbor 840 is located at $(x_1, y_1, z_1)$.

The communication duration $c_d$ between the vehicle 100 and neighbor 840 is computed as follows. Noticed that $c_d$ is the time when neighbor 840 exits from the communication range of the vehicle 100. At time $t_0+c_d$, the vehicle 100 moves to new location $(x_0, y_0, z_0)+c_d*\vec{v}$ and the neighbor 840 moves to new location $(x_1, y_1, z_1)+c_d*\vec{u}$. Since neighbor 840 is exiting from the communication range of the vehicle 100, its location must be on the surface of the sphere centered at location of vehicle 100. Therefore, following equation must hold $$|(x_1-x_0, y_1-y_0, z_1-z_0)+c_d(\vec{u}-\vec{v})|=R \quad (13)$$

In the equation (13), $c_d$ is only unknown. Thus, solving equation (13) gives communication duration between vehicle 100 and neighbor 840. To solve equation (13), let $\vec{v}=(v_x, v_y, v_z)$ and $\vec{u}=(u_x, u_y, u_z)$, then the communication duration $c_d$ is given by $$c_d = \frac{\sqrt{B^2 + A(R^2 - D^2)} - B}{A} \text{ where} \quad (14)$$

$$A = (u_x - v_x)^2 + (u_y - v_y)^2 + (u_z - v_z)^2,$$

$$B = (x_1 - x_0)(u_x - v_x) + (y_1 - y_0)(u_y - v_y) + (z_1 - z_0)(u_z - v_z), \text{ and}$$

$$D = \sqrt{(x_1 - x_0)^2 + (y_1 - y_0)^2 + (z_1 - z_0)^2}.$$

It can be seen that the D is the distance between vehicle 100 and a neighbor vehicle 840 when the first heartbeat message is received.

Some embodiments are based on recognition that the vehicle 100 may have multiple neighbors with longer communication duration. In this case, vehicle 100 needs to select more reliable neighbors among the neighbors with longer communication duration.

Machine learning provides a way to classify neighbors. Assume vehicle 100 has N (N≥4) neighbors with longer communication duration. The vehicle 100 then selects heartbeat messages received from M (N≥M≥4) reliable neighbors to perform clock synchronization and location determination. The neural network provides a way to select M reliable neighbors.

Figure 9:
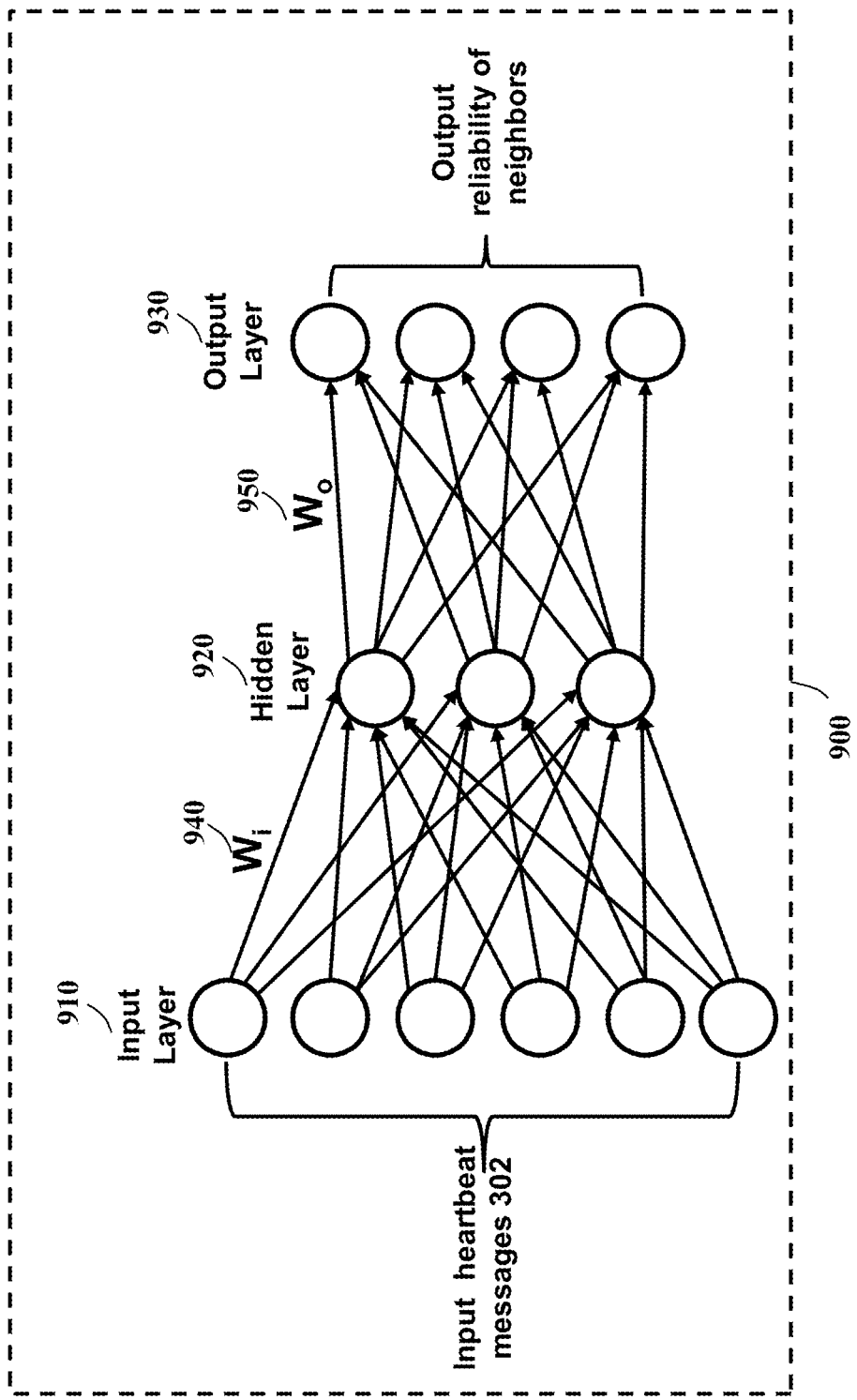
FIG. 9 shows a feed forward neural network designed according to some embodiments to select the group of neighboring vehicles for the silent synchronization.

FIG. 9 shows a feed forward neural network 900 designed according to some embodiments to select the group of neighboring vehicles for the silent synchronization. The neural network 900 includes an input layer 910, a hidden layer 920 and an output layer 930. The node in neural network is called as neuron. In a feed forward neural network, neurons at input layer connect to neurons at hidden layer and neurons at hidden layer connect to neurons at output layer. Each connection is assigned a weight. Therefore, all connections from input layer to hidden layer construct a weight vector $W_i$ 940 and all connections from hidden layer to output layer construct a weight vector $W_o$ 950.

The number of neurons at input layer depends on the number of input data. The heartbeat message transmitted by a neighbor consists of timestamp t, location (x, y, z), velocity $(v_x, v_y, v_z)$, acceleration, and other data. If timestamp t, location (x, y, z) and velocity $(v_x, v_y, v_z)$ are used as input data, each heartbeat message provides seven inputs. With N neighbors, the input layer has 7*N neurons. The number of neurons at hidden layer is determined during training process. The number of neurons in output layer is set to N so that each output neuron corresponds to a neighbor. The output value 1 indicates the corresponding neighbor is reliable and output value 0 indicates the corresponding neighbor is not reliable.

Neural network 900 is trained with the labeled data. The training process determines the number of neurons at hidden layer and weight vectors $W_i$ and $W_o$. The trained neural network is then used by vehicle 100 to select more reliable neighboring vehicle for performing silent synchronization.

Figure 10:
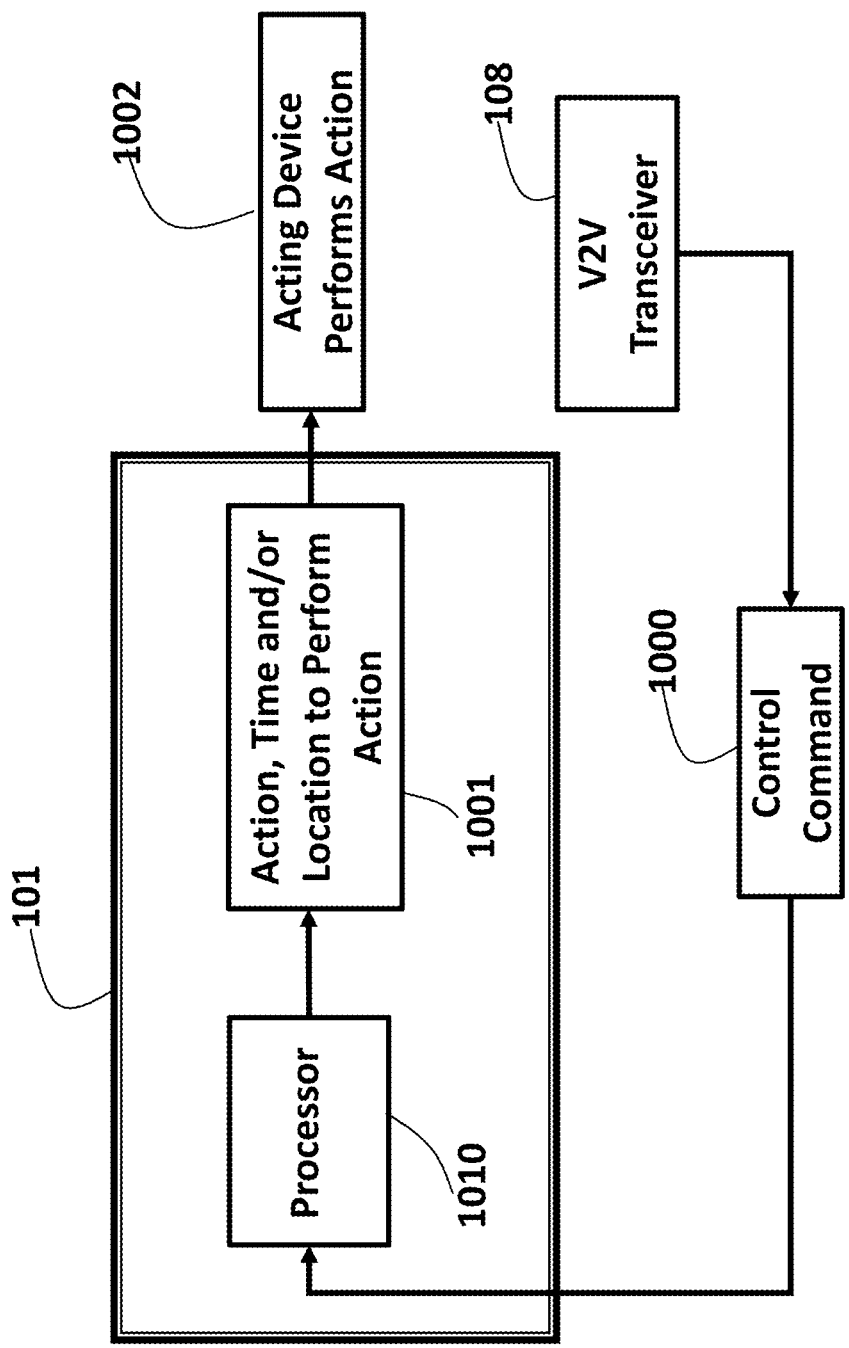
FIG. 10 shows a block diagram of the controller to process the received control command message in time sensitive networking according to one embodiment of the invention.

FIG. 10 shows a block diagram of the controller 101 to process the received control command message in time sensitive networking according to one embodiment of the invention. When V2V transceiver 108 receives an alert message or control command 1000, the processor 1010 of the controller 101 processes the received message 1000 to obtain action to be performed, the time and/or location to perform action. The controller 101 then generates an action message 1001 for the corresponding device 1002 to perform the action at specific time and/or specific location. The acting device 1002 can be steering wheel 102, brake system 103 and other component of the vehicle 100. An action can be speed up, slow down, left turn, right turn, etc.

Figure 11:
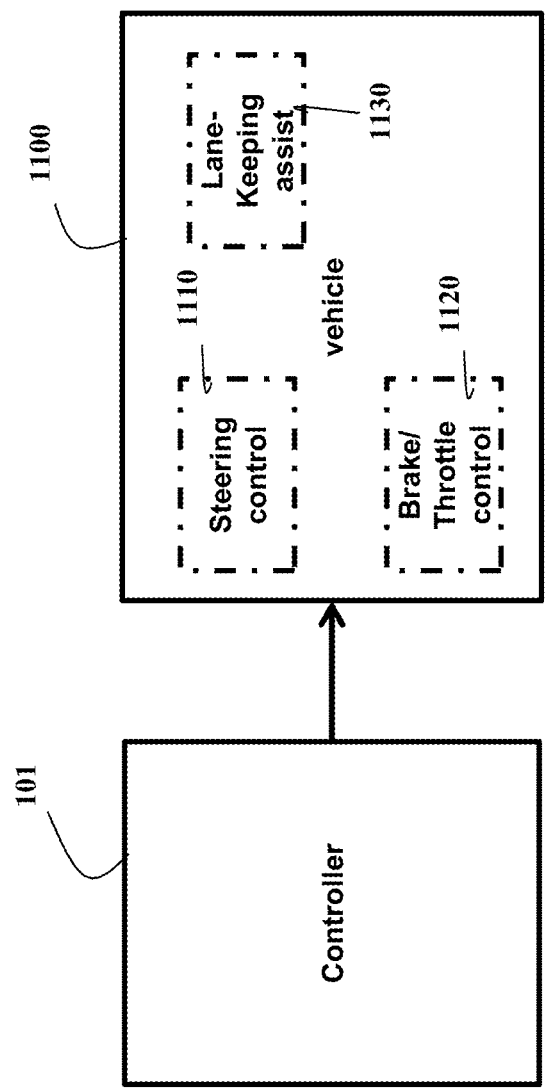
FIG. 11 shows a schematic of interaction between a synchronizing controller and other controllers of the vehicle according to one embodiment.

FIG. 11 shows a schematic of interaction between the controller 101 and the controllers 1100 of the vehicle 101 according to one embodiment. This embodiment is based on understanding that the action message 1001 generated by the controller 101 can be a time sensitive command subsequently handle by other controllers of the vehicle 101. For example, in some embodiments, the controllers 1100 of the vehicle 100 are steering 1110 and brake/throttle controllers 1120 that control rotation and acceleration of the vehicle. In such a case, the controller 101 can output control inputs to the controllers 1110 and 1120 to control the state of the vehicle. The controllers 1100 can also include high-level controllers, e.g., a lane-keeping assist controller 1130 that further process the control inputs of the controller 101. Eventually, the controllers 1100 maps use the outputs of the controller 101 to control at least one actuator of the vehicle, such as the steering wheel and/or the brakes of the vehicle, in order to control the motion of the vehicle.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A vehicle, comprising:
a controller to control an operation of at least one component of the vehicle;
a clock to synchronize the operation of the component of the vehicle;
a memory to store a clock offset to the clock of the vehicle to adjust the synchronization of the operation of the component of the vehicle;
a receiver to receive a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle; and
a processor to update the clock offset stored in the memory in response to determining concurrently an unknown clock offset and an unknown location of the vehicle at a particular time by comparing a first trilateration of distances traveled by light between the times of the transmission of the heartbeat messages and corresponding receipt times adjusted with the unknown clock offset with a second trilateration of distances between the vehicle at the unknown location and the locations of the neighboring vehicles retrieved from the heartbeat messages.

2. The vehicle of claim 1, further comprising:
an internal measurement unit (IMU) to determine a velocity of the vehicle, wherein the unknown location of the vehicle at the particular time in the second trilateration of distances is adjusted based on differences of the time of transmission of different heartbeat messages and the velocity of the vehicle.

3. The vehicle of claim 1, wherein the number of the heartbeat messages is equal to or greater than the number of unknowns in the first triangulation and the second triangulation.

4. The vehicle of claim 3, wherein the receiver receives the heartbeat messages greater than the number of unknowns, and selects the set of heartbeat messages with differences of the time of transmission less than a threshold.

5. The vehicle of claim 1, further comprising:
a navigation system to determine a location of the vehicle at a current time measured by the clock having the clock offset;
an internal measurement unit (IMU) to determine a velocity of the vehicle at the current time; and
a transmitter to transmit a heartbeat message of the vehicle including the current time, the location determined by the navigation system and the velocity determined by the IMU.

6. The vehicle of claim 1, wherein the processor selects a group of neighboring vehicles from the set of neighboring vehicles to perform synchronization over a number of iterations, wherein each neighboring vehicle from the group has a location and a velocity with respect to the location and the velocity of the vehicle placing the neighboring vehicle within a communication range over a duration defined by a frequency of heartbeat message transmission and a predetermined number of iterations.

7. The vehicle of claim 6, wherein the processor submits the timestamps, locations and the velocities of the neighboring vehicles to a neural network to select the group of reliable neighboring vehicles.

8. The vehicle of claim 1, wherein the receiver receives an indication of a group of neighboring vehicles for performing a joint control application.

9. The vehicle of claim 1, wherein the processor determines concurrently the unknown clock offset and the unknown location of the vehicle based on heartbeat messages received from the neighboring vehicles using a comparison system equivalent to $$c(t_{r1}-t_{t1}+c_o)=\sqrt{(x_1-x)^2+(y_1-y)^2+(z_1-z)^2}$$

$$c(t_{r2}-t_{t2}+c_o)=\sqrt{(x_2-x)^2+(y_2-y)^2+(z_2-z)^2}$$

$$c(t_{r3}-t_{t3}+c_o)=\sqrt{(x_3-x)^2+(y_3-y)^2+(z_3-z)^2}$$

$$c(t_{r4}-t_{t4}+c_o)=\sqrt{(x_4-x)^2+(y_4-y)^2+(z_4-z)^2},$$

wherein c is the speed of the light, $t_{ti}$ (i=1, 2, 3, 4) is the time at which the neighboring vehicles $V_i$ (i=1, 2, 3, 4) transmits the heartbeat message, $t_{ri}$ (i=1, 2, 3, 4) is the time at which the vehicle receives the heartbeat message from the neighboring vehicle $V_i$ (i=1, 2, 3, 4), and $(x_i, y_i, z_i)$ is the location of the neighboring vehicle $V_i$ (i=1, 2, 3, 4).

10. The vehicle of claim 1, wherein the processor determines concurrently the unknown clock offset and the unknown location of the vehicle based on heartbeat messages received from the neighboring vehicles using a comparison system equivalent to $$\sqrt{(x_1-x_0-(t_{r1}-t_{mi})v_x)^2+(y_1-y_0-(t_{r1}-t_{mi})v_y)^2+(z_1-z_0-(t_{r1}-t_{mi})v_z)^2}=c(t_{r1}-t_{t1}+c_o),$$

$$\sqrt{(x_2-x_0-(t_{r2}-t_{mi})v_x)^2+(y_2-y_0-(t_{r2}-t_{mi})v_y)^2+(z_2-z_0-(t_{r2}-t_{mi})v_z)^2}=c(t_{r2}-t_{t2}+c_o),$$

$$\sqrt{(x_3-x_0-(t_{r3}-t_{mi})v_x)^2+(y_3-y_0-(t_{r3}-t_{mi})v_y)^2+(z_3-z_0-(t_{r3}-t_{mi})v_z)^2}=c(t_{r3}-t_{t3}+c_o),$$

$$\sqrt{(x_4-x_0-(t_{r4}-t_{mi})v_x)^2+(y_4-y_0-(t_{r4}-t_{mi})v_y)^2+(z_4-z_0-(t_{r3}-t_{mi})v_z)^2}=c(t_{r4}-t_{t4}+c_o),$$

wherein c is the speed of the light, $t_{ti}$ (i=1, 2, 3, 4) is the time at the neighboring n vehicle $V_i$ (i=1, 2, 3, 4) transmits the heartbeat message, $t_{ri}$ (i=1, 2, 3, 4) is the time at which the vehicle receives the heartbeat message from the neighboring vehicle $V_i$ (i=1, 2, 3, 4), $(x_i, y_i, z_i)$ is the location of the neighboring vehicle $V_i$ transmitted in its heartbeat message, $t_{mi}=\min\{t_{r1}, t_{r2}, t_{r3}, t_{r4}\}$, $(x_0, y_0, z_0)$ is the location of vehicle at time $t_{mi}$ and $(v_x, v_y, v_z)$ is the velocity of vehicle at the time $t_{mi}$, $c_o$ is the clock offset.

11. A method for controlling a vehicle, wherein the method uses a processor coupled with stored instructions implementing the method, wherein the instructions, when executed by the processor carry out at least some steps of the method, comprising:

receiving a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle;

determining concurrently an unknown clock offset and an unknown location of the vehicle at a particular time by comparing distances between the vehicle at the unknown location and the locations of the neighboring vehicles retrieved from the heartbeat messages with distances traveled by light between the times of the transmission of the heartbeat messages and corresponding receipt times adjusted with the unknown clock offset;

updating a clock of the vehicle with the determined clock offset; and controlling an operation of at least one component of the vehicle according to the updated clock of the vehicle.

12. The method of claim 11, further comprising:

determining a velocity of the vehicle; and adjusting the unknown location of the vehicle at the particular time based on differences of the time of transmission of different heartbeat messages and the velocity of the vehicle.

13. The method of claim 11, further comprising:

selecting a group of neighboring vehicles from the set of neighboring vehicles to perform synchronization of the clock over a number of iterations, wherein each neighboring vehicle from the group has a location and a velocity with respect to the location and the velocity of the vehicle placing the neighboring vehicle within a communication range over a duration defined by a frequency of heartbeat message transmission and a predetermined number of iterations.

14. The vehicle of claim 13, wherein the selecting includes submitting data from the heartbeat messages of the neighboring vehicles to a neural network to select the group of neighboring vehicles.

15. The method of claim 11, wherein the receiver receives an indication of a group of neighboring vehicles for performing a joint control application.

16. A non-transitory computer readable storage medium embodied thereon a program executable by a processor for performing a method, the method comprising:

receiving a set of heartbeat messages from a set of neighboring vehicles, each heartbeat message received from a neighboring vehicle includes a time of transmission of the heartbeat message, a location of the neighboring vehicle and a velocity of the neighboring vehicle, wherein the receiver receives each heartbeat message at a corresponding receipt time measured using the clock of the vehicle;

determining concurrently an unknown clock offset and an unknown location of the vehicle at a particular time by comparing distances between the vehicle at the unknown location and the locations of the neighboring vehicles retrieved from the heartbeat messages with distances traveled by light between the times of the transmission of the heartbeat messages and corresponding receipt times adjusted with the unknown clock offset;

updating a clock of the vehicle with the determined clock offset; and controlling an operation of at least one component of the vehicle according to the updated clock of the vehicle.

* * * * *